United States Patent
Curtis et al.

[11] Patent Number: 5,952,621
[45] Date of Patent: Sep. 14, 1999

[54] SOUND ATTENUATION SYSTEM AND RELATED METHOD

[75] Inventors: Alan R. D. Curtis, Acton; Richard Madden, Groton; Paul J. Remington, Sudbury, all of Mass.

[73] Assignee: GTE Internetworking Incorporated, Cambridge, Mass.

[21] Appl. No.: 09/060,070

[22] Filed: Apr. 15, 1998

Related U.S. Application Data

[60] Provisional application No. 60/043,941, Apr. 16, 1997.
[51] Int. Cl.$^6$ .................................................. B64D 33/02
[52] U.S. Cl. ........................................... 181/213; 181/214
[58] Field of Search .................................... 181/213, 214, 181/215, 216, 219, 220, 206; 60/262, 264; 239/265.13, 265.17, 265.19

[56] References Cited

U.S. PATENT DOCUMENTS

| | | | |
|---|---|---|---|
| 3,437,173 | 4/1969 | Ehrich | 181/213 |
| 3,542,152 | 11/1970 | Adamson et al. | 181/213 |
| 4,215,536 | 8/1980 | Rudolph | 181/213 |

*Primary Examiner*—Khanh Dang
*Attorney, Agent, or Firm*—Leonard Charles Suchyta

[57] ABSTRACT

The present invention is noise attenuation system and related method for suppressing noise generated by a noise source, such as a jet engine, contained in a housing. An impedance device is positioned in the housing to attenuate the amplitude of sound waves generated by the noise source propagating in one direction and to create a reflected sound wave. The reflected sound wave is out of phase with the sound waves propagating from the noise source away from the impedance device. The reflected sound wave destructively interferes with this sound wave to attenuate the amplitude.

29 Claims, 5 Drawing Sheets

SOUND ATTENUATION SYSTEM AND RELATED METHOD

CROSS REFERENCE TO RELATED APPLICATION(S)

This application claims priority rights under 35 U.S.C. § 111(b)(4) based on provisional U.S. patent application 60/043,941 filed on Apr. 16, 1997.

BACKGROUND OF THE INVENTION

This invention relates to the field of noise reduction. More particularly, this invention relates to a system and method for reducing noise generated by a jet engine.

Jet aircraft typically generate high noise levels that are radiated into the surrounding environment. The noise is disruptive for individuals who work or live near airports. New methods and devices for controlling the noise generated by jet aircraft are constantly being sought by aircraft designers and manufacturers.

The majority of the sound radiated by the aircraft is created by the engines that power the aircraft. The current, modern day high by-pass engine design includes a housing known as a nacelle surrounding the jet engine. The engine produces thrust by turning a fan within the nacelle. A set of stator vanes are positioned in the nacelle, near the fan to stabilize the air flow created by the fan. The noise generated by the engine is largely a result of the interaction between the engine fan and stator vanes and, to a lesser degree, the exhaust of the engine.

The engine noise generated by the fan-stator interaction contains both broad band and tonal components. The frequency of the tones generated by the engine at a given time depends on the speed of the engine, the geometry of the engine, and the number of fan blades and stator vanes. The speed of movement of the engine parts, like the fan, for example, depends upon whether the plane is taking off, landing, or cruising at altitude. It is highly desirable to attenuate engine sound noise generated when the aircraft is taking off or landing to reduce the noise generated around airports.

Attempts have been made to suppress the jet engine noise by including a sound absorbing liner in the nacelle surrounding the jet engine. This liner effectively absorbs sound, but its effectiveness is limited by the lack of available space on the wall of the nacelle. In addition, the current trend in engine design is to increase the diameter of the engines while proportionately decreasing the length of the engines. In this design, the absorptive liners will become less effective.

In light of the foregoing there is a need for a compact, light weight sound attenuation system that will suppress noise generated by a jet engine without affecting engine performance or increasing engine weight.

SUMMARY OF THE INVENTION

Accordingly, the present invention is directed to a sound attenuation system that substantially obviates one or more of the limitations and disadvantages of prior art printing systems. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a sound attenuation system for suppressing noise from a noise source. The noise source is surrounded by an elongated housing having an inner and outer wall and a first and second opening on opposite ends of the housing. The noise source produces a first sound wave that propagates outwardly towards the first opening and a second sound wave that propagates outwardly towards the second opening. An impedance device is positioned intermediate the first and second openings on the inner wall of the housing. The impedance device attenuates the amplitude of the second sound wave and creates a reflected sound wave directed towards the first opening. The reflected sound wave is out of phase with the first sound wave and, thus, destructively interferes with the first sound wave to attenuate the amplitude of the first sound wave.

According to another aspect, the invention is directed to a sound attenuation system for suppressing noise from a jet engine. The jet engine is surrounded by a nacelle having an inner and outer wall and a first and second opening on opposing ends of the nacelle. The jet engine produces a first sound wave that propagates outwardly towards the first opening and a second sound wave that propagates outwardly towards the second opening. An impedance device is positioned intermediate the first and second openings on the inner wall of the nacelle. The impedance device attenuates the amplitude of the second sound wave and creates a reflected sound wave directed towards the first opening. The reflected sound wave is out of phase with the first sound wave and, thus, destructively interferes with the first sound wave to attenuate the amplitude of the first sound wave.

In another aspect, the invention is directed to a sound attenuation system for suppressing noise from a jet engine. The jet engine is surrounded by a nacelle having an inner and outer wall and a first and second opening on opposing ends of the nacelle. The jet engine produces a first sound wave that propagates outwardly towards the first opening and a second sound wave that propagates outwardly towards the second opening. An impeding means is positioned intermediate the first and second openings on the inner wall of the nacelle. The impeding means attenuates the amplitude of the second sound wave and creates a reflected sound wave directed towards the first opening. The reflected sound wave is out of phase with the first sound wave and, thus, destructively interferes with the first sound wave to attenuate the amplitude of the first sound wave.

In still another aspect, the invention is directed to a method of attenuating sound produced by a jet engine. The jet engine is contained in a nacelle that has an inlet and an outlet. The jet engine generates a first sound wave traveling towards the inlet and a second sound wave traveling towards the outlet. The method comprises the step of impeding the second sound wave by partially reflecting the second sound wave to attenuate the amplitude of the second sound wave and to create a reflected sound. The reflected sound wave is out of phase with the first sound wave, and, thus, destructively interferes with the first sound wave to attenuate the amplitude of the first sound wave.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION

Reference will now be made in detail to the presently preferred embodiment of the invention, an example of which is illustrated in the accompanying drawings. Wherever possible, the same reference numbers will be used throughout the drawings to refer to the same or like parts.

The present invention is directed to a sound attenuation system for suppressing noise from a noise source. In accordance with the present invention, the noise source is contained in a housing and is capable of producing a first sound wave and a second sound wave. In the exemplary embodiment, the noise source is a jet engine surrounded by a nacelle. Many different jet engine designs are known in the art. It is contemplated that the present invention may be used to suppress the noise generated by any design of jet engine as well as the noise generated by any source contained in a housing in which suppression of sound radiation from both the inlet and outlet is desired An exemplary embodiment of a jet engine assembly is shown in FIG. 1 and is designated generally by reference number 20.

Figure 1:
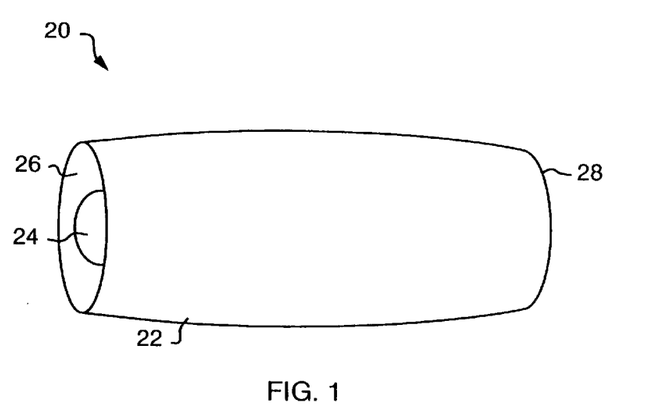
FIG. 1 is a pictorial view of a jet engine assembly.

As embodied herein and as illustrated in FIG. 1, jet engine assembly 20 has an elongated housing, also known as a nacelle 22 surrounding a jet engine 24. Nacelle 22 has a first opening 26 at the front of assembly 20 and a second opening 28 at the rear of assembly 20. First opening 26 acts as an air inlet and second opening 28 acts as an air outlet.

Figure 2:
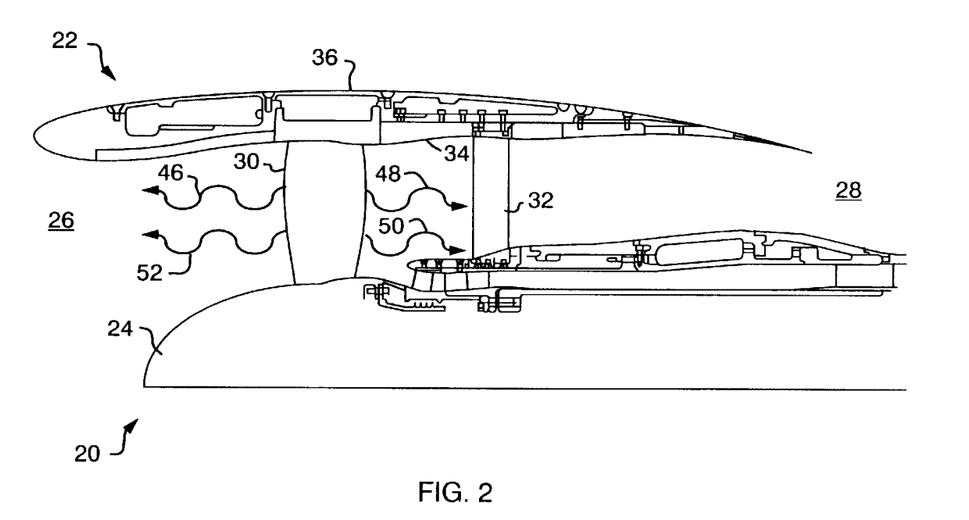
FIG. 2 is a partial cross sectional view of the assembly of FIG. 1.

As illustrated in FIG. 2, nacelle 22 has an inner wall 34 and an outer wall 36. A set of stationary stator vanes 32 are positioned between nacelle 22 and jet engine 24. Jet engine 24 has a fan 30 which rotates to push air through stator vanes 32 and out second opening 28.

Figure 3A:
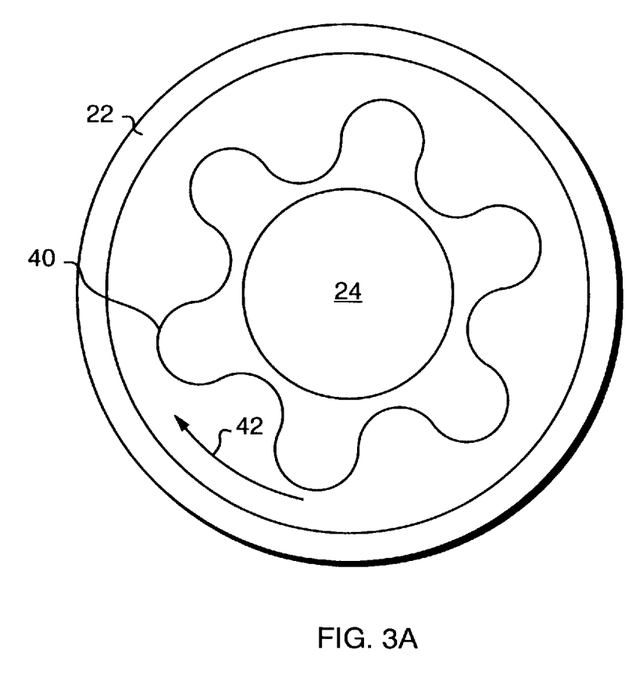
FIG. 3a is a graphical representation of the pressure differentials in the jet engine assembly.
Figure 3B:
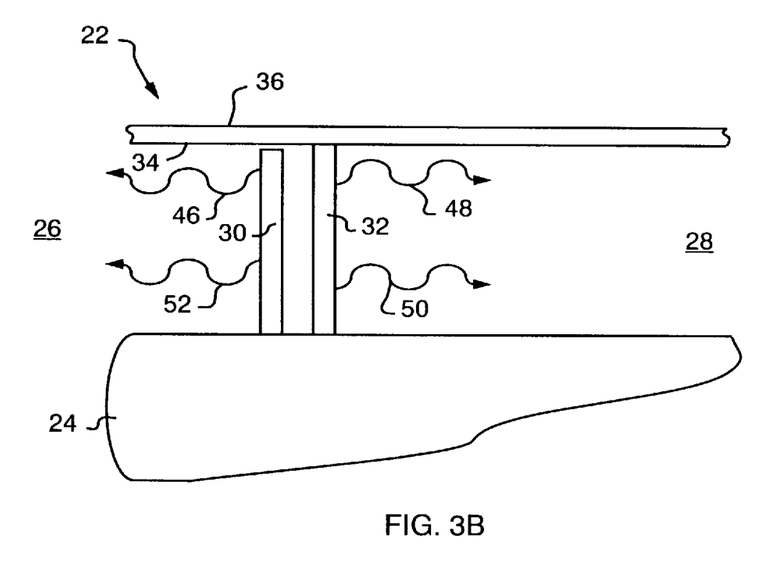
FIG. 3b is a graphical representation of sound waves propagating in the jet engine assembly.

The operation of the jet engine creates a significant amount of noise. The noise is generated primarily by pressure fluctuations on the stationary stator vanes generated by flow disturbances from the rotating fan. As illustrated in FIG. 3a, the acoustic pressure 40 created within the nacelle 22 by the interaction of the fan and stator vanes varies sinusoidally in the circumferential direction around the jet engine 24. The acoustic pressure also varies radially through the nacelle in a complicated pattern. This pattern or mode shape of acoustic pressure rotates as shown by arrow 42. Depending on the engine geometry, the mode shape of acoustic pressure may decay rapidly as it propagates away from the stator vanes or may propagate to the inlet and outlet of the nacelle where it will radiate to the environment. As illustrated in FIG. 3b, sound waves 46, 48, 50, and 52 of varying frequencies propagate within the nacelle. The sound waves 48 and 50 propagate towards second opening 28. Other sound waves 46 and 52 propagate towards the first opening 26. Without any sound attenuation system these sound waves will propagate to the environment to create the noise associated with the jet engine.

In accordance with the present invention an impedance device is provided. The impedance device provides a means of attenuating the amplitude of the sound wave propagating towards the second opening in the nacelle and creating a reflected sound wave propagating towards the first opening in the nacelle. The reflected sound wave is out of phase with the first sound wave and, thus, destructively interferes with the first sound wave to attenuate the amplitude of the first sound wave.

Figure 4:
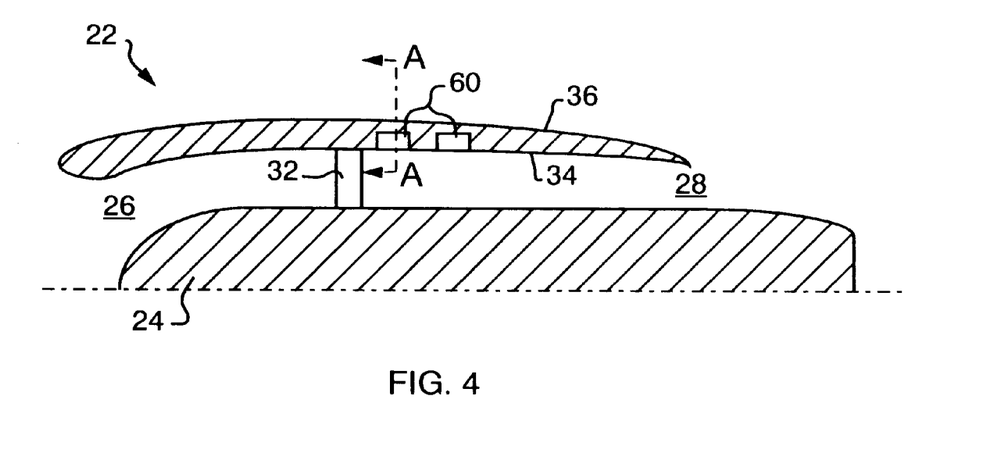
FIG. 4 is a cross sectional view of the nacelle of the present invention.

As embodied herein and as best illustrated in FIG. 4, nacelle 22 has cavities 60 along inner wall 34. The cavities 60 extend circumferentially around inner wall 34. In the preferred embodiment, the cavities 60 extend along the entire circumference of the inner wall 34.

Figure 5:
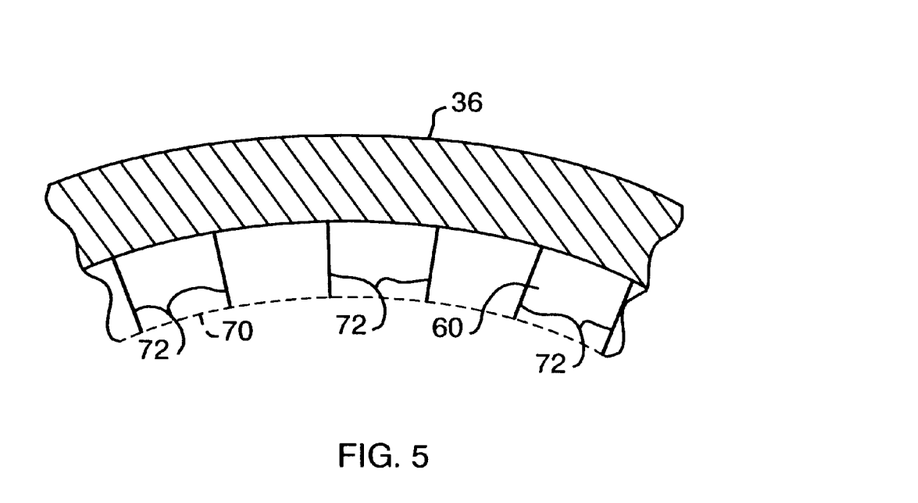
FIG. 5 is a cross sectional view of an impedance device of the present invention, taken along line A—A of FIG. 4.

As illustrated in FIG. 5, cavity 60 is covered by a screen 70. The screen 70 is supported by narrow baffles 72. The baffles 72 also prevent sound from propagating within the cavity in the circumferential direction. In the preferred embodiment, screen 70 is a wire mesh having an acoustic impedance, the real part of which is less than 0.10 ρc, where ρc is the acoustic impedance of air. More preferably the real part of the acoustic impedance of the wire mesh is about 0.05 ρc.

The wire mesh screen 70 prevents the air flowing through the jet engine assembly from flowing into the cavities 60. Thus, engine performance is not significantly affected by the cavities 60. Also, because the cavities are located on the nacelle, the cavities will not significantly affect the design of the engine. In addition, the cavities do not add significant weight to the engine and will not subtract from the performance of the engine.

The cavities 60 act as an impedance device on the sound waves propagating through the jet engine assembly. As the sound waves propagate over the cavities 70, the wire mesh screen 70 allows air to be pushed into and out of the cavity 60. In this manner, the amplitude of the sound wave is attenuated and a reflected sound wave is created.

Figure 6:
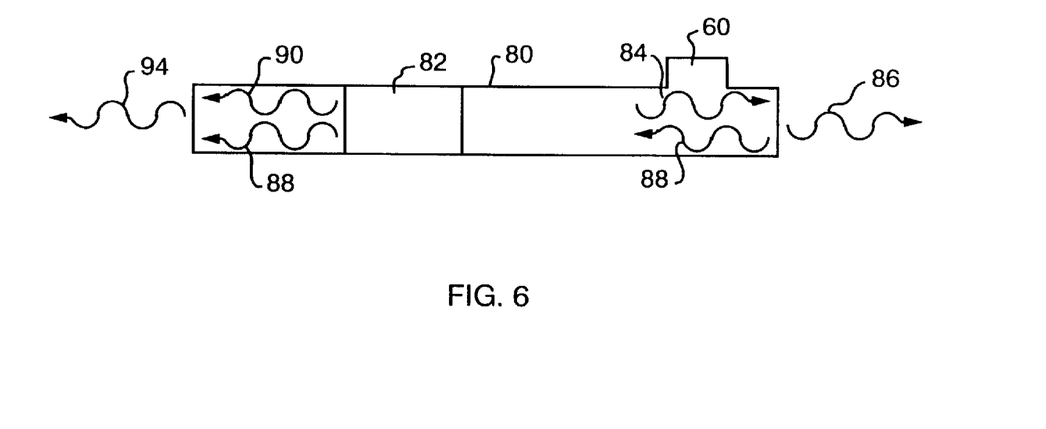
FIG. 6 is a graphical illustration of the impedance device of the present invention.

A theoretical model of the impedance device is illustrated in FIG. 6. A noise source 82 in a tube 80 generates a sound wave 84 propagating towards cavity 60 and a sound wave 90 propagating away from cavity 60. The sound waves 84 and 90 have the same frequency. As sound wave 84 propagates past cavity 60, the impedance change created by the presence of the cavity 60 attenuates the amplitude of sound wave 86 and creates a reflected sound wave 88 propagating back towards noise source 82. Depending on the impedance of cavity 60, reflected sound wave 88 will have the same frequency as sound wave 90 but be out of phase. Because the reflected sound wave 88 is out of phase, the reflected sound wave 88 destructively interferes with sound wave 90. The result is that the sound waves 86 and 94 exiting tube 80 have amplitudes less than the sound waves 84 and 90 produced by the noise source 82. In this manner, the sound generated by the noise source can be substantially suppressed.

Figure 7:
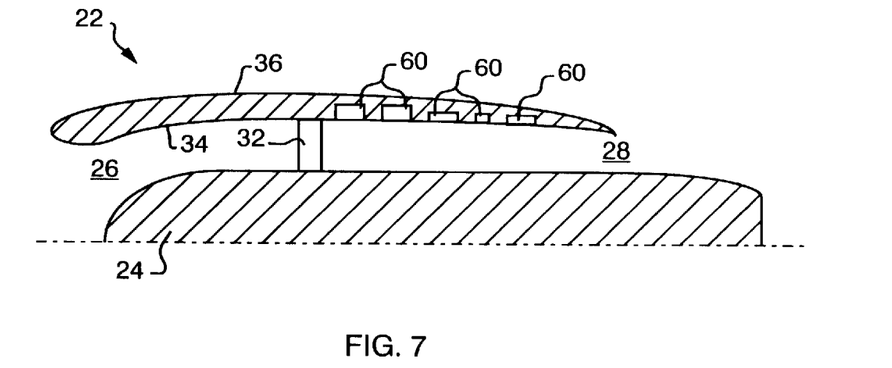
FIG. 7 is a cross sectional view of another embodiment of the present invention.

In the preferred embodiment, and as illustrated in FIG. 7, several cavities 60 are 20 placed along the inner wall 34 of the nacelle 22. Each cavity 60 has a different axial length and depth to provide a different impedance to the propagating sound waves. Any number of cavities 60 may be positioned on the inner wall 34, each one being designed to impede a certain frequency of sound wave.

Figure 8:
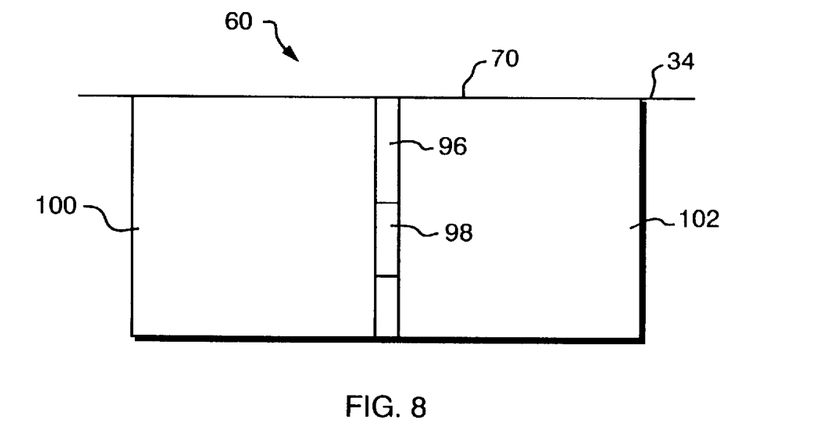
FIG. 8 is a cross sectional view of another embodiment of the cavity of the present invention.
Figure 9:
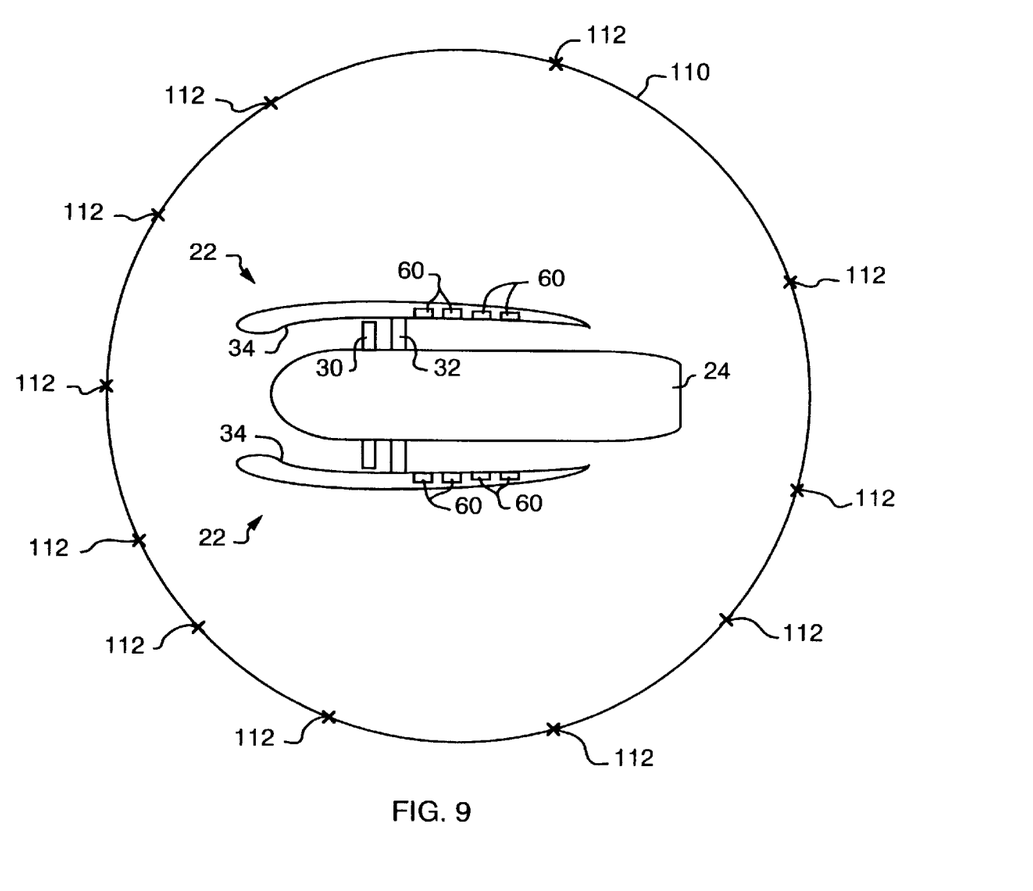
FIG. 9 is a graphical representation of the analytical model used to determine the dimensions of the impedance devices.

The present invention also contemplates using cavities 60 having a more complex internal structure than the generally rectangular cavities 60 shown in FIGS. 4 and 7. As shown in FIG. 8, cavity 60 could have a wall 96 dividing the cavity into two sections 100 and 102. Wall 96 has a hole 98 connecting the two section 100 and 102. This more complex internal structure could be used to impede a broad band of frequencies.

The dimensions and internal structure of cavities 60 vary depending upon the to frequencies that are to be attenuated or the range of frequencies over which broad band attenuation is desired. An analytical model can be used to determine the dimensions of the cavities to provide the optimum sound attenuation. As shown in FIG. 8, an arbitrary boundary 110 is drawn around the jet engine assembly 20. Several areas of interest 112 in the environment are chosen along the boundary 110. The location of the cavities 60 are chosen along the inner wall 34 of the nacelle.

The first step is to determine the optimal volume velocities in the cavities, which can be determined by the following formula:

$$q_{optimum} = \text{Pseudo Inverse } (H) \times Pf$$

where:

$q_{optimum}$ is the vector of optimum volume velocities in the cavities;

Pseudo Inverse (H) is a matrix of transfer functions relating the vector of volume velocities in the cavities to the vector of far field pressures at a number of points in the environment; and Pf is the vector of pressures at locations of interest in environment due to the internal noise sources in the nacelle.

Once the optimum volume velocities are determined, the optimum impedance for each cavity $Z_p$ can be found with the following formula:

$$\underline{Z}_p = -\underline{P}_{po} - Z_n \underline{q}_{optimum}$$

where $\underline{Z}_p$ is the vector of desired cavity impedance;

$\underline{P}_{po}$ is the vector of pressures on the wall of the nacelle (due to the noise sources in the nacelle) at the cavity locations before the cavities are installed;

$Z_n$ is the impedance looking into the nacelle from the cavity; and $q_{optimum}$ is the vector of optimum volume velocities given above.

Often these calculations will specify impedances for the cavities that have real parts that are negative and are, therefore, not passive. Experience has shown, however, that forcing these impedances to be passive by making the real parts positive but small in comparison to the acoustic impedance of air will not significantly reduce the sound attenuation of the cavities.

After determining the optimal impedance of each cavity, the dimensions of simple cavities to achieve these impedances can then be derived with the following formula:

$$Z = R - i * \rho c * Ai/Ac * \cos(2\pi * f/c * L)/\sin(2\pi * f/c * L)$$

where function Z is Z_port (f) found above;

R is the flow resistance of screen;

L is the cavity length;

Ac is the area of cavity;

Ai is the area of inlet;

ρc is the acoustic impedance of air.

For more complicated structures in the cavities, similar formulas can be derived by one skilled in the art.

It will be apparent to those skilled in the art that various modifications and variations can be made in the method of manufacture of the present invention and in construction of this sound attenuation system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A sound attenuation system for suppressing noise from a noise source capable of producing a first sound wave and a second sound wave, the system comprising:

an elongated housing surrounding the noise source, the housing having an inner wall, an outer wall, and a first and second opening on opposite ends of the housing, wherein the first sound wave from the noise source propagates outwardly towards the first opening and the second sound wave propagates from the noise source outwardly towards the second opening; and an impedance device positioned intermediate the first and second openings on the inner wall of the housing, the impedance device comprising an elongated channel having a continuos opening into the interior of the housing and extending circumferentially along the inner wall of the housing and being configured to attenuate the amplitude of the second sound wave and to create a reflected sound wave directed towards the first opening, the reflected sound wave being out of phase with the first sound wave such that the reflected sound wave destructively interferes with the first sound wave, thereby attenuating the amplitude of the first sound wave.

2. The system of claim 1, wherein the elongated channel extends around the entire circumference of the inner wall of the housing.

3. The system of claim 1, wherein the elongated channel has a generally rectangular cross section.

4. The system of claim 1, wherein a wall is disposed in the elongated channel to form two sections, the wall having a hole open to each of the sections.

5. The system of claim 1, wherein each of the first and second sound wave have the same frequency and the impedance device is configured to impede sound waves having the particular frequency.

6. A sound attenuation system for suppressing noise from a noise source capable of producing a first sound wave and a second sound wave, the system comprising:

an elongated housing having a generally cylindrical shape and surrounding the noise source, the housing having an inner wall, an outer wall, and a first and second opening on opposite ends of the housing, the first sound wave propagating from the noise source towards the first opening and the second sound wave propagating from the noise source towards the second opening;

an impedance device defined by the inner wall of the housing and positioned intermediate the first and second openings, the impedance device having the shape of an elongated cavity extending circumferentially along the inner wall of the housing and being configured to attenuate the amplitude of the second sound wave and to create a reflected sound wave directed towards the first opening, the reflected sound wave being out of phase with the first sound wave such that the reflected sound wave destructively interferes with the first sound wave, thereby attenuating the amplitude of the first sound wave; and a screen covering the elongated cavity, wherein the screen is a mesh screen having an acoustic impedance, the real part of the acoustic impedance being less than 0.10 ρc, wherein ρc is the acoustic impedance of air.

7. The system of claim 6, wherein the real part of the acoustic impedance is about 0.05 ρc.

8. The system of claim 1, further comprising a plurality of impedance devices.

9. The system of claim 8, wherein the noise source produces a plurality of sound waves, each sound wave being within a broad band of frequencies, the plurality of impedance devices being operable to impede the plurality of sound waves within the broad band of frequencies.

10. The system of claims 8, wherein each of the plurality of impedance devices is an elongated channel extending circumferentially on the inner wall of the housing.

11. The system of claim 10, further comprising a plurality of screens, each screen covering one of the elongated channels.

12. The system of claim 1, wherein the noise source is a jet engine and the housing is a nacelle.

13. The system of claim 1, wherein the noise source produces a third sound wave propagating towards the first opening and a fourth sound wave propagating towards the second opening, the first and second sound waves having a different frequency than the third and fourth sound waves.

14. The system of claim 13, further comprising a second impedance device, the second impedance device operable to attenuate the amplitude of the fourth sound wave and to create a reflected sound wave directed towards the first opening, the reflected sound wave being out of phase with the third sound wave such that the reflected sound wave destructively interferes with the third sound wave, thereby attenuating the amplitude of the third sound wave.

15. A sound attenuation system for suppressing noise from a jet engine, the jet engine operable to produce a first sound wave and a second sound wave, the system comprising:

a nacelle surrounding the jet engine, the nacelle having an inner wall, an outer wall, and a first and second opening on opposite ends of the nacelle, wherein the first sound wave propagates from the jet engine outwardly towards the first opening and the second sound wave propagates from the jet engine outwardly towards the second opening; and an impedance device positioned intermediate the first and second openings on the inner wall of the nacelle, the impedance device comprising an elongated channel having a continues opening into the interior of the housing and extending circumferentially along the inner wall of the housing and being configured to attenuate the amplitude of the second sound wave and to create a reflected sound wave directed towards the first opening, the reflected sound wave being out of phase with the first sound wave such that the reflected sound wave destructively interferes with the first sound wave, thereby attenuating the amplitude of the first sound wave.

16. The system of claim 15, wherein the elongated channel extends around the entire circumference of the inner wall of the nacelle.

17. The system of claim 15, wherein the elongated channel has a generally rectangular cross section.

18. The system of claim 15, wherein a wall is disposed in the elongated channel to form two sections, the wall having a hole open to each of the sections.

19. The system of claim 15, wherein each of the first and second sound waves have the same frequency and the impedance device is configured to impede sound waves having the particular frequency.

20. The system of claim 15, further comprising a plurality of impedance devices.

21. The system of claim 20, wherein the jet engine produces a plurality of sound waves, each sound wave being within a broad band of frequencies, the plurality of impedance devices being operable to impede the plurality of sound waves within the broad band of frequencies.

22. The system of claim 20, wherein each of the plurality of impedance devices is an elongated channel extending circumferentially on the inner wall of the nacelle.

23. The system of claim 20, further comprising a plurality of screens, each screen covering one of the elongated channels.

24. The system of claim 15, wherein the jet engine produces a third sound wave propagating towards the first opening and a fourth sound wave propagating towards the second opening, the first and second sound waves having a different frequency than the third and fourth sound waves.

25. The system of claim 24, further comprising a second impedance device, the second impedance device operable to attenuate the amplitude of the fourth sound wave and to create a reflected sound wave directed towards the first opening, the reflected sound wave being out of phase with the third sound wave such that the reflected sound wave destructively interferes with the third sound wave, thereby attenuating the amplitude of the third sound wave.

26. A sound attenuation system for suppressing noise from a jet engine, the jet engine operable to produce a first sound wave and a second sound wave, the system comprising:

a nacelle having a generally cylindrical shape and surrounding the jet engine, the nacelle having an inner wall, an outer wall, and a first and second opening on opposite ends of the nacelle, wherein the first sound wave propagates from the jet engine outwardly towards the first opening and the second sound wave propagates from the jet engine outwardly towards the second opening;

an impedance device defined by the inner wall of the nacelle and positioned intermediate the first and second openings, the impedance device having the shape of an elongated cavity extending circumferentially along the inner wall of the housing and being configured to attenuate the amplitude of the second sound wave and to create a reflected sound wave directed towards the first opening, the reflected sound wave being out of phase with the first sound wave such that the reflected sound wave destructively interferes with the first sound wave, thereby attenuating the amplitude of the first sound wave; and a screen disposed to cover the elongated cavity. wherein the screen is a mesh screen having an acoustic impedance having a real part of less than 0.10 ρc, where ρc is the acoustic impedance of air.

27. The system of claim 26, wherein the real part of the acoustic impedance is about 0.05 ρc.

28. A method of attenuating sound produced by a jet engine contained in a nacelle having an inlet and an outlet, the jet engine generating a first sound wave and a second sound wave within the nacelle, the first sound wave propagating towards the inlet of the nacelle and the second sound wave propagating towards the outlet of the nacelle, the method comprising the steps of:

impeding the second sound wave by partially reflecting the second sound wave to attenuate the amplitude of the second sound wave and to create a reflected sound wave being out of phase with the first sound wave such that the reflected sound wave destructively interferes with the first sound wave to attenuate the amplitude of the first sound wave.

29. The method of claim 28, wherein the second sound wave is impeded by a circumferential cavity on an interior surface of the nacelle.

\* \* \* \* \*

UNITED STATES PATENT AND TRADEMARK OFFICE
CERTIFICATE OF CORRECTION

PATENT NO. : 5,952,621
DATED : September 14, 1999
INVENTOR(S) : Alan R.D. Curtis, et al.

It is certified that error appears in the above-identified patent and that said Letters Patent is hereby corrected as shown below:

<u>Column 1,</u>
Line 9, before "BACKGROUND OF THE INVENTION" please enter the following:

-- STATEMENT REGARDING FEDERALLY SPONSORED
RESEARCH OR DEVELOPMENT

This invention was made with Government support under Contract No. NAS1-20101 awarded by the National Aeronautics and Space Administration. The Government has certain rights in this invention. --

Signed and Sealed this

Fourth Day of September, 2001

*Attest:*

*Attesting Officer*

NICHOLAS P. GODICI
*Acting Director of the United States Patent and Trademark Office*